(12) United States Patent
Vande Berg

(10) Patent No.: US 6,727,457 B1
(45) Date of Patent: Apr. 27, 2004

(54) APPARATUS FOR DRAFT CONTROL AND DEBRIS COLLECTION IN A DOWNDRAFT METAL CUTTING TABLE

(76) Inventor: David M. Vande Berg, 770 Seventh St. NW., Sioux Center, IA (US) 51250

( * ) Notice: Subject to any disclaimer, the term of this patent is extended or adjusted under 35 U.S.C. 154(b) by 134 days.

(21) Appl. No.: 10/044,177

(22) Filed: Jan. 10, 2002

(51) Int. Cl.$^7$ .............................................. B23K 10/00
(52) U.S. Cl. ........................ 219/121.58; 219/121.39; 219/121.48
(58) Field of Search .................. 219/121.58, 121.39, 219/121.48, 121.6, 121.67; 83/451, 167; 266/48, 49, 65; 454/49, 7; 372/107; 126/622, 629, 628, 286; 409/137

(56) References Cited

U.S. PATENT DOCUMENTS

| | | |
|---|---|---|
| 3,701,514 A | 10/1972 | Walters et al. |
| 3,850,086 A * | 11/1974 | Walters et al. ................ 454/49 |
| 4,067,556 A * | 1/1978 | Lagerwall et al. ............ 266/65 |
| 4,441,934 A | 4/1984 | Kawakami |
| 4,898,089 A | 2/1990 | Roos |
| 6,165,410 A * | 12/2000 | Crees et al. .................. 266/49 |
| 6,222,155 B1 * | 4/2001 | Blackmon et al. ..... 219/121.39 |
| 6,320,153 B1 | 11/2001 | Hulings et al. |
| 6,424,670 B1 * | 7/2002 | Sukhman et al. ........... 372/107 |

* cited by examiner

*Primary Examiner*—Quang T. Van

(57) ABSTRACT

An apparatus for draft control and debris collection in a downdraft metal cutting table includes one or more partitions positioned beneath the work surface of the table which divide the table into a plurality of suction zones, each of which communicate with a suction source. Each suction zone is equipped with a damper positioned to selectively control airflow through the respective suction zone between the suction source and the work surface. Each damper includes a damper flap having a proximate end pivotally connected to the table. Actuators selectively open and close the damper flaps. When the flaps are open, a distal end of each flap extends downwardly from the proximate end. Slidably removable debris collection receptacles are positioned beneath the dampers such that when said dampers are open, debris falling through the work surface is directed into the receptacles by the damper flaps.

27 Claims, 3 Drawing Sheets

APPARATUS FOR DRAFT CONTROL AND DEBRIS COLLECTION IN A DOWNDRAFT METAL CUTTING TABLE

BACKGROUND OF THE INVENTION

1. Field of the Invention

The invention relates to an apparatus and method for draft control and easy debris removal in a downdraft cutting table. Downdraft tables are typically used by industry to cut shapes out of metal using manual or automated means to control the movement of a plasma or laser cutting head.

2. Description of the Related Art

It is common practice in industry to use a vacuum based downdraft table to remove smoke and collect the related debris caused by cutting metal with plasma or laser cutting equipment. In the metal cutting process, byproducts of smoke and airborne particulate matter are produced. The smoke and particulate matter creates an inhalation health concern for the workers who are operating the cutting equipment. Downdraft tables are typically used in an attempt to remove the smoke and airborne particulate matter from the air the workers breath. In addition, particulate matter and small scrap drop off parts are collected in the bottom of the downdraft table. Typically downdraft tables produce a vacuum under the metal being cut by use of fans to draw the smoke and debris down and away from the worker.

One problem with such tables results from the fact that the fan must draw the airborne smoke and debris from the entire area of the cutting table. The suction created by the fan is often not great enough to remove the airborne smoke. In order to concentrate the suction of the downdraft table the worker must place a covering such as another piece of metal or nonflammable tarpaulin over the area of the table not covered by the metal that is being cut.

In an effort to create as much suction as possible, most downdraft tables minimize the distance between the cutting area and the suction fan and provide the most direct air route available. A problem is created when an air filter is then used to clean and return the air to the workers' environment because airborne sparks arriving at the air filter elements will burn holes in the air filter element, gradually reducing the ability of the filter to properly clean the air, and creating the possibility of a fire. In addition, most downdraft tables have no easy way to remove the particulate debris and small scraps that accumulate in the bottom of the table. This results in the necessity of regularly taking the table out of commission for cleaning.

What is needed is a downdraft table that will allow for effective concentration of suction for smoke removal in the cutting area while depositing particulate debris and small scraps in an easily removable cleaning receptacles while reducing the possibility of passing sparks to an air cleaning filter.

SUMMARY OF THE INVENTION

The present invention comprises an apparatus for draft control and debris collection in a downdraft metal cutting table is disclosed. The apparatus includes one or more partitions positioned beneath the work surface of the table which divide the table into a plurality of suction zones, each of which communicate with a suction source. Each suction zone is equipped with a damper positioned to selectively control airflow through the respective suction zone between the suction source and the work surface. Each damper includes a damper flap having a proximate end pivotally connected to the table. Means are provided for selectively opening and closing the damper flaps. When the flaps are open, a distal end of each flap extends downwardly from the proximate end. Slidably. removable debris collection receptacles are positioned beneath the dampers such that when said dampers are open, debris falling through the work surface is directed into the receptacles by the damper flaps.

DETAILED DESCRIPTION OF THE PREFERRED EMBODIMENT

Figure 1:
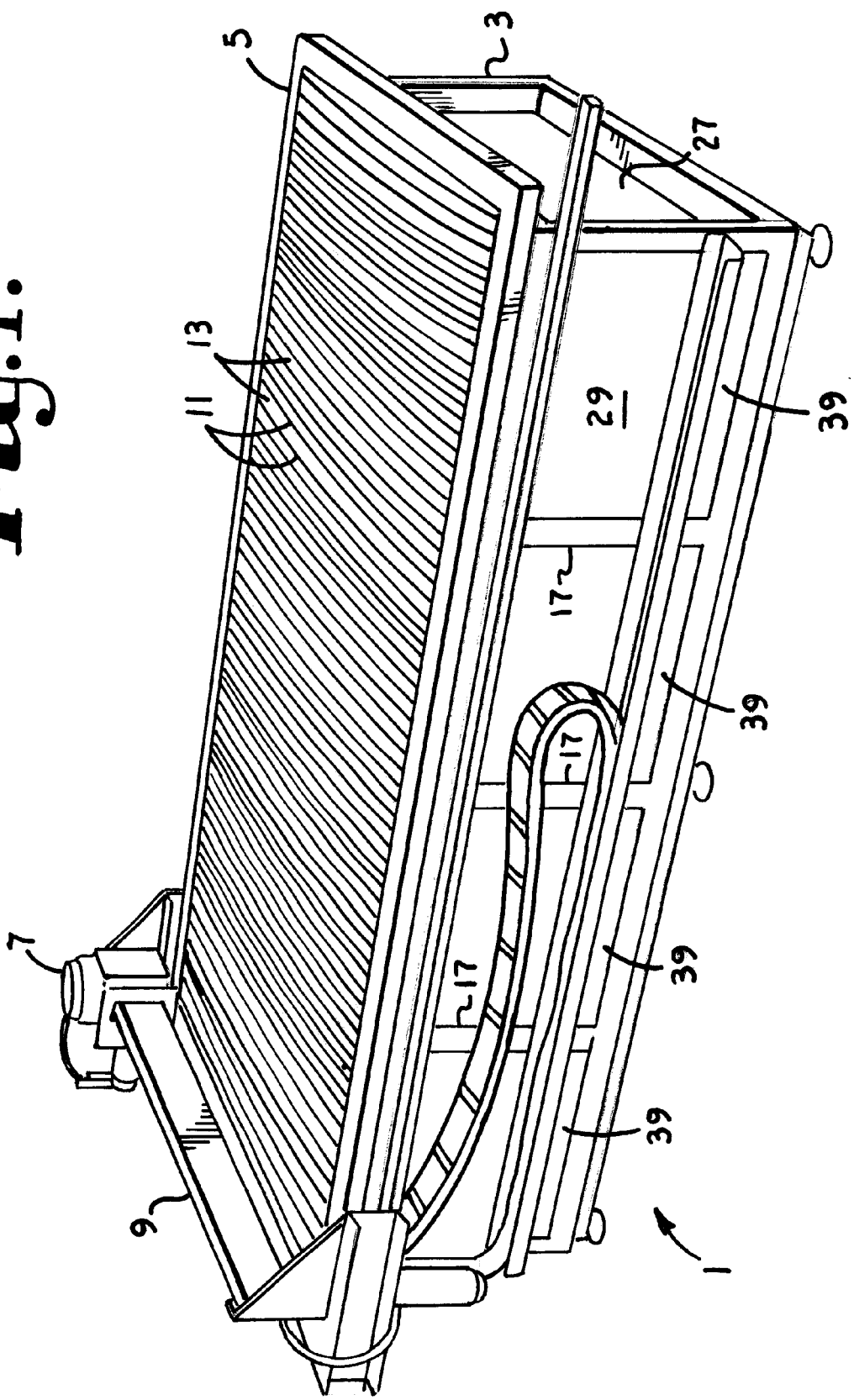
FIG. 1 is a perspective view of a downdraft cutting table utilizing automated control of the cutting head.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof Said terminology will include the words specifically mentioned, derivatives thereof and words of a similar import.

Referring to the drawings in more detail, the reference number 1 generally designates a downdraft metal cutting table having frame 3 and a perforated work surface 5 for supporting a sheet of metal to be cut. The table 1 further includes a moveable cutting head 7 which carries a plasma torch or laser which is utilized to perform the cutting operation. The cutting head 7 is laterally moveable relative to the work surface 5 along a gantry 9 which is in turn longitudinally moveable along the work surface 5. Movement of the cutting head 7 and gantry 9 is controlled using Computer Numeric Control (CNC) by a computer (not shown) which is programmable to cut the metal sheet into pre-selected shapes.

Figure 2:
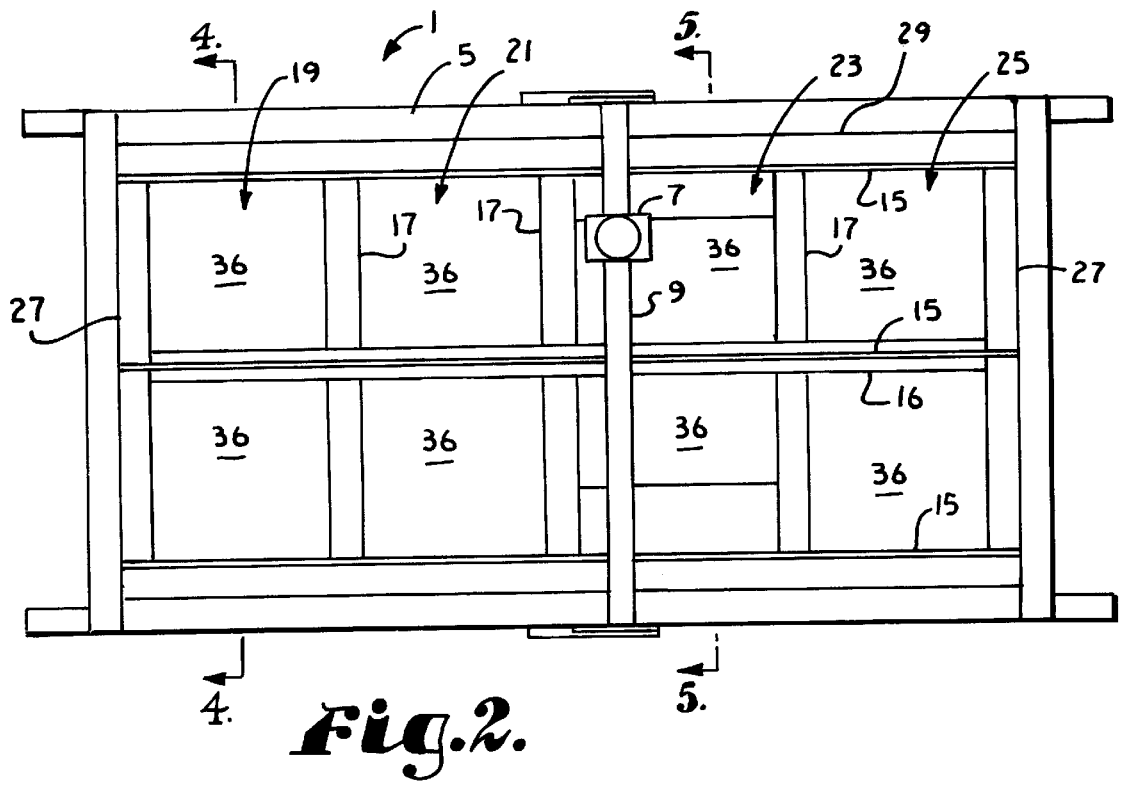
FIG. 2 is a top view of the cutting table with the grating removed for clarity.
Figure 3:
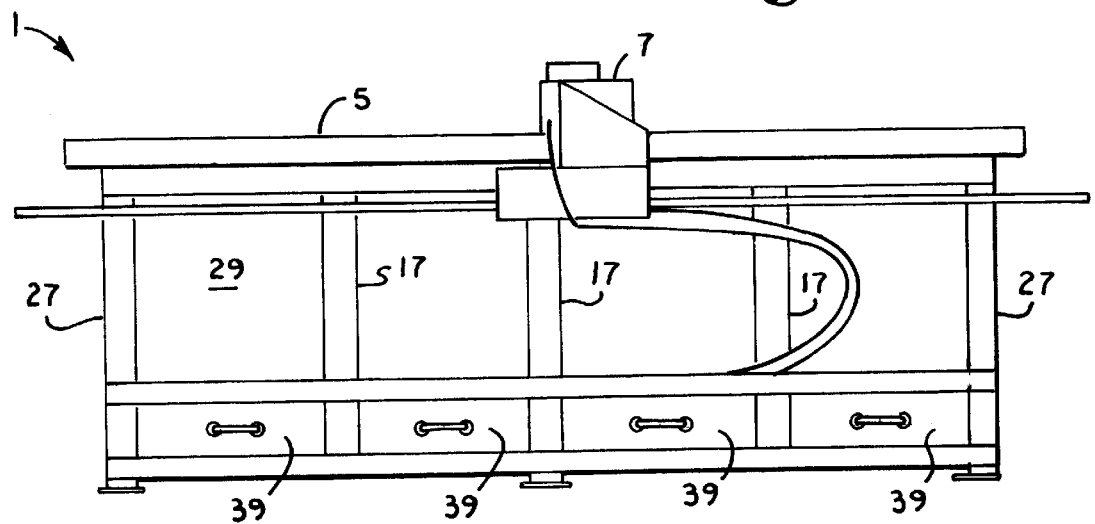
FIG. 3 is a side view of the cutting table.

The work surface 5 is comprised of a plurality of thin arcuate metal grate strips 11 set on edge and positioned in spaced relation to one another so as to define openings 13 therebetween. The openings 13 allow smoke and particulate matter to pass through the work surface 5. The grating strips 11 are supported and held in position by grating supports 15 (see FIG. 2) which are rigidly attached to the frame 3. One of the grating supports 15 is mounted on a longitudinal center rail 16 and provides midline support for the grating strips 11.

A plurality of longitudinally spaced partitions 17 (three shown) positioned beneath the work surface 5 divide the table 1 into a plurality of suction zones such as the four zones designated 19, 21, 23 and 25. End panels 27 and side panels 29 enclose the ends and sides of the table 1, respectively. Openings 31 formed in the partitions 17 and one of the end panels 27 form a passageway or duct 33 down the center of the table 1 which connects zones 19, 21, 23 and 25 to an outside suction fan (not shown) which may include an air filtration system (not shown).

Figure 4:
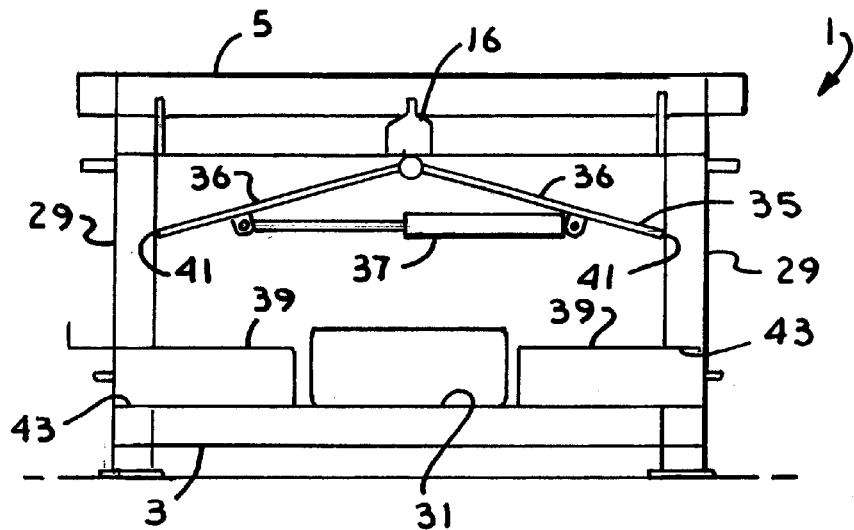
FIG. 4 is a cross-sectional view taken generally along line 4—4 in FIG. 2 and showing the dampers in a closed orientation.
Figure 5:
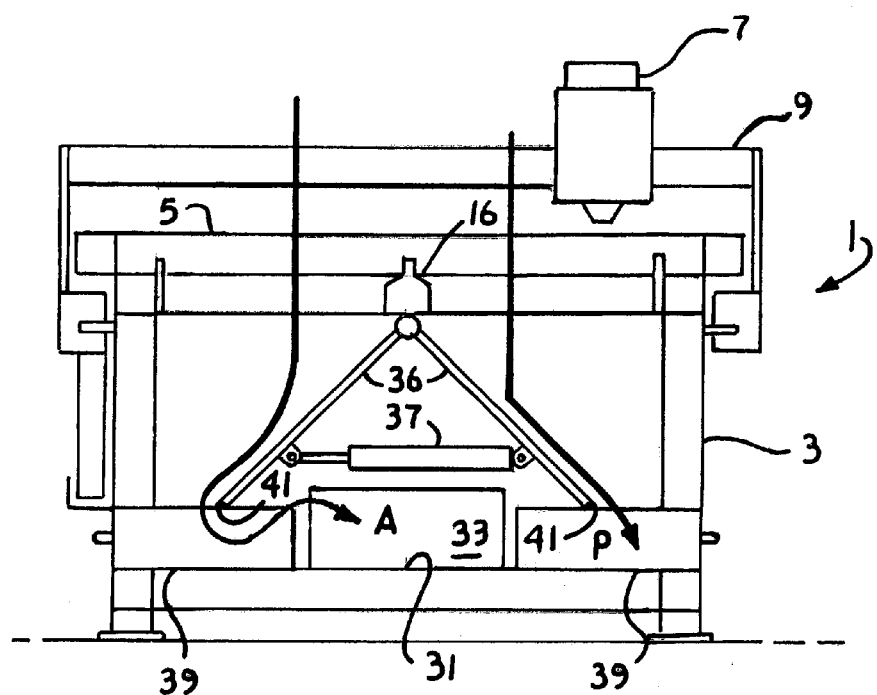
FIG. 5 is a cross-sectional view taken generally along line 5—5 in FIG. 2 and showing the dampers in an open orientation.

Each suction zone 19, 21, 23 and 25 is selectively placed in communication with the work surface 5 by a damper 35 comprising a pair of flaps 36 which are hingedly connected to the center rail 16. Each damper 35 is provided with a damper operating means for moving the respective damper 35 between a closed position as shown in FIG. 4 and an open position as shown in FIG. 5. In the closed position, each damper 35 prevents airflow through the respective suction zone. In the open position, the dampers 35 allow air to flow through the respective suction zone from the section of the work surface 5 positioned thereabove.

A preferred damper operating means comprises linear actuators 37, such as pneumatic or hydraulic cylinders, which are connected between the respective pairs of damper flaps 36. The dampers 35 could also be manually operated using hand levers or electrically operated by use of motors or other actuators known in the art. The Computer Numeric Control (CNC) cutting head positioning control computer can be configured to automatically activate the appropriate actuator 37 corresponding to a particular suction zone whenever the cutting head 7 is positioned over or close to the particular zone. By opening the dampers 35 in the zones close to the cutting head 7 and keeping the dampers 35 closed in suction zones remote from the cutting head 7, suction from the fan is concentrated into the suction zones in which cutting is occurring.

Positioned below each damper flap 36 is a respective debris collection drawer 39. Each suction zone 19, 21, 23 and 25 has two drawers 39 positioned therein on opposing sides of the duct 33. When the dampers 35 are in the open position (see FIG. 5), an outboard end 41 of each damper flap 36 is positioned proximate the top of a respective drawer 39 such that air must flow through the drawer 39 as it is drawn through the work surface 5 and into the duct 33. The drawers 39 are each slidably removable from the table 1 through respective openings 43 in the side panels 29.

In use, one or more selected suction zones positioned proximate the cutting head 7 are opened by retracting the respective cylinder 37 thereby moving dampers 35 to the open position as shown in FIG. 5. When the dampers 35 are open, air is allowed to flow through the respective drawer 39. Air flowing through the drawers 39 takes a sharp turn, which may be as much as 180 degrees, as indicated by air flow path A and follows this path to the center duct 33. Heavier particulate matter, sparks, and scraps small enough to fall through openings 13 between the grate strips 11 either fall directly into the drawers 39 or follow a particulate path P down along the damper flaps 36 and into the drawers 39. Removal of particulate matter and small scraps is easily accomplished by withdrawing the drawer 39 and dumping the contents in an appropriate waste receptacle. Zones 19, 21, 23 and 25 can be opened for air flow individually or in any combination to allow optimal operation.

As the cutting head 7 moves away from a suction zone, the respective damper 35 is closed by extending cylinder 37 until the outboard ends 41 of the damper flaps 36 are positioned against side panels 29, blocking airflow through the suction zone.

It has been found that concentrating suction from the fan by use of dampers 35 to restrict suction to zones proximate the cutting head 7 greatly reduces the amount of smoke which escapes into the environment. In addition, the sharp turn in the air path produced by the dampers 35 ensures that sparks are not drawn into the air cleaning filters. Instead, the sparks and heavy particulate matter are deposited into in the drawers for ease of cleaning.

It is to be understood that while certain forms of the present invention have been illustrated and described herein, it is not to be limited to the specific forms or arrangement of parts described and shown. For example, while the table 1 has been described herein as being computer controlled, it is to be understood that a manually operated table could incorporate the features of the present invention.

It is also to be understood that although the damper flaps 36 have been described above as both controlling airflow through the respective suction zones and acting as deflectors to direct debris into the drawers 39, tables embodying the present invention need not include damper flaps 36 which perform both functions simultaneously. For example, in certain embodiments, debris may be deflected into the drawers or receptacles 39 by flaps or deflectors 36 which are held stationary and do not also serve as dampers. In other embodiments, the flaps 36 may only serve as dampers and not also act to deflect debris into drawers 39.

What is claimed and desired to be secured by letters patent is as follows:

1. In a metal cutting table having a perforated work surface supported on a frame, ends and sides on the frame defining a chamber below the work surface, a cutting head moveable relative to the work surface, and a ventilation system including a suction source for drawing air downwardly through the work surface, a draft control and debris collection apparatus comprising:

a) one or more partitions positioned beneath the work surface and dividing the chamber into a plurality of suction zones, each of said suction zones communicating with the suction source;

b) a plurality of dampers, each of said dampers being positioned beneath the work surface within a respective one of said suction zones and including a damper flap, each said damper flap having a proximate end pivotally connected to the frame and a distal end opposite said proximate end, each said damper flap being moveable between an open position and a closed position so as to selectively control airflow through said respective suction zone between the suction source and the work surface, said distal end extending downwardly from said proximate end in said open position; and c) means for opening selected ones of said damper flaps when the cutting head is moved proximate the respective suction zone and closing said damper flaps when the cutting head moves away from the respective cutting zone; and d) a plurality of debris collection receptacles, one of said receptacles being positioned beneath each of said damper flaps such that when said dampers are in said open position debris falling through the work surface is directed into said receptacles by said damper flaps.

2. The draft control and debris collection apparatus as in claim 1 wherein said means for opening and closing said damper flaps is controlled by a computer, said computer also functioning to control movement of the cutting head.

3. The draft control and debris collection apparatus as in claim 1 wherein each of said receptacles is a drawer slidably removable from the table.

4. The draft control and debris collection apparatus as in claim 1 wherein said partitions extend transversely across said table between opposite table sidewalls.

5. The draft control and debris collection apparatus as in claim 4 wherein said dampers each comprise a pair of said damper flaps, said proximate ends of said flaps being pivotally connected to the table frame proximate the midline of the table.

6. The draft control and debris collection apparatus as in claim 5 wherein said means for opening and closing said damper flaps comprises a plurality of linear actuators, each of which is connected between the damper flaps of a respective damper.

7. The draft control and debris collection apparatus as in claim 5 wherein said distal ends of said damper flaps extend outwardly and downwardly from said proximate ends in spaced relation to the table sidewalls when said damper flaps are in said open position.

8. The draft control and debris collection apparatus as in claim 7 wherein each of said receptacles comprises a drawer slidable relative to the table frame and removable through openings in the table sidewalls.

9. The draft control and debris collection apparatus as in claim 8 wherein said distal ends of said damper flaps are each positioned proximate an upper portion of a respective one of said drawers when the respective damper is in the open position such that air flowing between the work surface and the suction source must pass through said drawers.

10. The draft control and debris collection apparatus as in claim 9 wherein each of said dampers includes a pair of said damper flaps hingedly connected to the table frame proximate the midline of the table.

11. The draft control and debris collection apparatus as in claim 9 wherein said distal end of each said damper flap is positioned proximate an upper portion of the respective debris collection receptacle when said damper is in said open position such that air flowing between the work surface and the suction source must pass through said receptacle.

12. The draft control and debris collection apparatus as in claim 9 wherein each said debris collection receptacle is a drawer slidably removable from said table.

13. In a metal cutting table having a perforated work surface supported on a frame, ends and sides on the frame defining a chamber below the work surface, a cutting head moveable relative to the work surface, a computer programmable to control movement of the cutting head, and a ventilation system including a suction source for drawing air downwardly through the work surface, a draft control and debris collection apparatus comprising:

a) one or more partitions positioned beneath the work surface and dividing the chamber into a plurality of suction zones, each of said suction zones communicating with the suction source;

b) a plurality of dampers, each of said dampers being positioned beneath the work surface within a respective one of said suction zones and including a damper flap, each said damper flap having a proximate end pivotally connected to the frame and a distal end opposite said proximate end, each said damper flap being moveable between an open position and a closed position so as to selectively control airflow through said respective suction zone between the suction source and the work surface, said distal end extending downwardly from said proximate end in said open position;

c) a plurality of linear actuators, each of said linear actuators being connected to a respective one of said dampers and controlled by the computer to automatically open selected ones of said damper flaps when the cutting head is moved proximate the respective suction zone and to close said damper flaps when the cutting head moves away from the respective cutting zone; and d) a plurality of debris collection receptacles, each of said receptacles being positioned below a respective one of said damper flaps such that debris falling through the work surface is directed into said receptacles by said flaps.

14. In a metal cutting table having a perforated work surface supported on a frame, ends and sides on the frame defining a chamber below the work surface, a cutting head moveable relative to the work surface, and a ventilation system including a suction source for drawing air downwardly through the work surface, a draft control apparatus comprising:

a) one or more partitions positioned beneath the work surface and extending transversely across said table between opposite table sidewalls, said partitions dividing the chamber into a plurality of suction zones;

b) an airflow passageway extending longitudinally along a midline of said table through aligned openings in said partitions;

c) a plurality of dampers, each of said dampers being positioned beneath the work surface and above said airflow passageway within a respective one of said suction zones; and d) means for opening selected ones of said dampers when the cutting head is moved proximate the respective suction zone and closing said dampers when the cutting head moves away from the respective cutting zone.

15. The draft control and debris collection apparatus as in claim 14 wherein said means for opening and closing said damper flaps is controlled by a computer, said computer also functioning to control movement of the cutting head.

16. The draft control apparatus as in claim 14 wherein each of said dampers comprises a pair of damper flaps, each of said flaps having a proximate end and a distal end, said proximate end being pivotally connected to the table frame proximate the midline of the table.

17. The draft control apparatus as in claim 16 wherein said means for opening and closing said damper flaps comprises a plurality of linear actuators, each of which is connected between the damper flaps of a respective damper.

18. The draft control apparatus as in claim 16 wherein said distal ends of said damper flaps extend downwardly when the respective damper is open.

19. The draft control apparatus as in claim 18 in combination with a debris collection apparatus comprising a plurality of drawers slidable relative to the table frame and removable through openings in the table sidewalls, one of said drawers being positioned beneath each of said damper flaps such that when said dampers are open debris falling through the work surface is directed into said drawers by said damper flaps.

20. The draft control and debris collection apparatus as in claim 19 wherein said distal ends of said damper flaps are each positioned proximate an upper portion of a respective one of said drawers when the respective damper is in the open position such that air flowing between the work surface and the suction source must pass through said drawers.

21. In a metal cutting table having a perforated work surface supported on a frame, ends and sides on the frame defining a chamber below the work surface, a cutting head moveable relative to the work surface, and a ventilation system including a suction source for drawing air downwardly through the work surface, a debris collection apparatus comprising:

a) one or more partitions positioned beneath the work surface and dividing the chamber into a plurality of zones;

b) a plurality of deflectors positioned beneath the work surface within a respective one of said zones, each said deflector having a proximate end connected to the frame and a distal end opposite said proximate end, said distal end extending downwardly from said proximate end; and c) a plurality of debris collection receptacles, one of said receptacles being positioned beneath each of said deflector such that debris falling through the work surface is directed into said receptacles by said deflectors.

22. The debris collection apparatus as in claim 21 wherein each of said receptacles is a drawer slidably removable from the table.

23. The debris collection apparatus as in claim 21 wherein said partitions extend transversely across said table between opposite table sidewalls.

24. The debris collection apparatus as in claim 23 wherein there are a pair of said deflectors within each of said zones, and said proximate ends of said deflectors are connected to the table frame proximate the midline of the table.

25. The debris collection apparatus as in claim 24 wherein there are a pair of said receptacles for each of said zones, and each of said receptacles is a drawer slidably removable from the table.

26. The debris collection apparatus as in claim 24 wherein each of said deflectors is pivotally connected to the table frame proximate the midline of the table and further acts as a damper flap, each said damper flap being moveable between an open position and a closed position so as to selectively control airflow through the respective zone between the suction source and the work surface.

27. The apparatus as in claim 26 and further including means for opening selected ones of said damper flaps when the cutting head is moved proximate the respective suction zone and closing said damper flaps when the cutting head moves away from the respective cutting zone.

* * * * *